No. 778,294. PATENTED DEC. 27, 1904.
T. L. WILLCOX.
HAND PLOW.
APPLICATION FILED SEPT. 9, 1904.
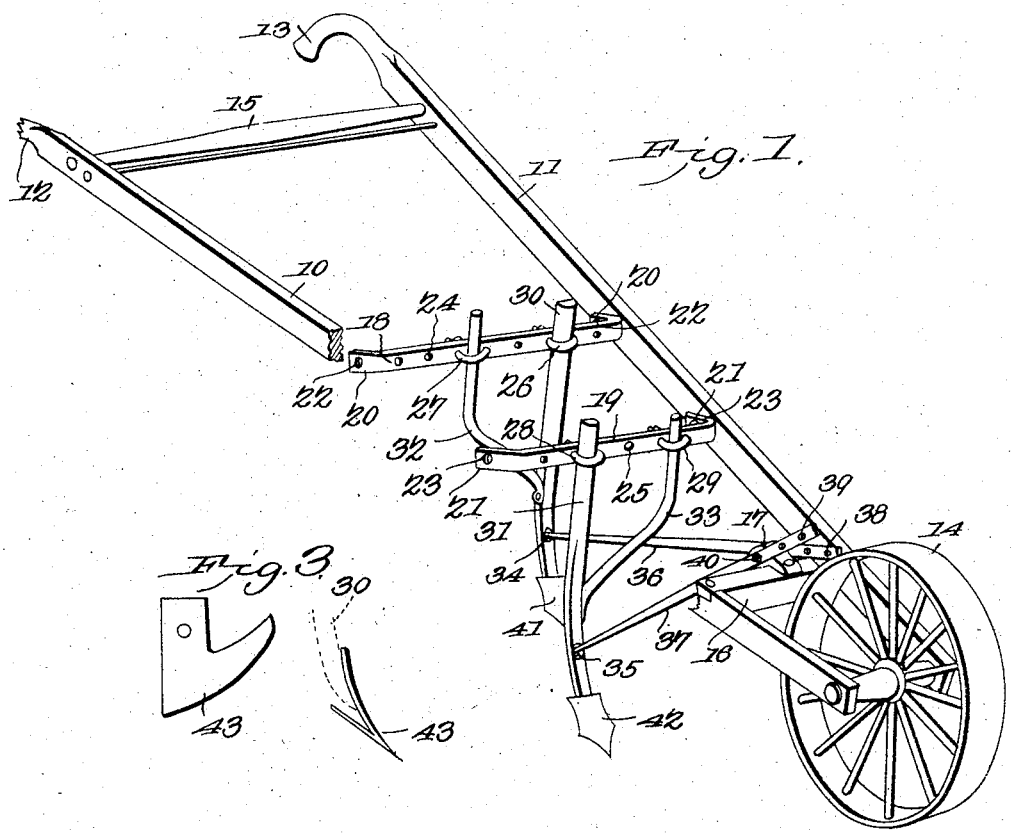
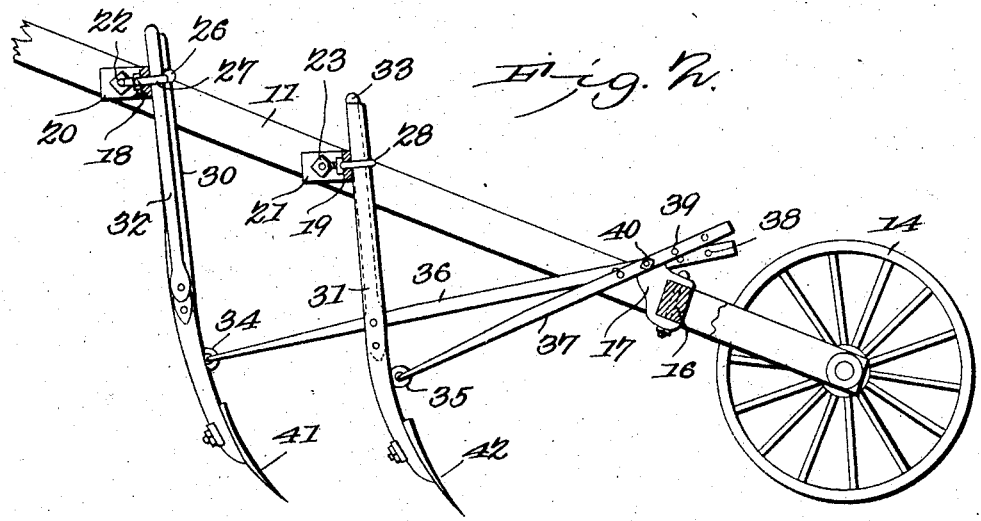
Witnesses
Thomas L. Willcox, Inventor.
by C. A. Snow & Co.
Attorneys No. 778,294. Patented December 27, 1904.

UNITED STATES PATENT OFFICE.

THOMAS L. WILLCOX, OF CLARION, IOWA.

HAND-PLOW.

SPECIFICATION forming part of Letters Patent No. 778,294, dated December 27, 1904.

Application filed September 9, 1904. Serial No. 223,895.

*To all whom it may concern:*

Be it known that I, THOMAS L. WILLCOX, a citizen of the United States, residing at Clarion, in the county of Wright and State of Iowa, have invented a new and useful Hand-Plow, of which the following is a specification.

This invention relates to certain improvements in hand cultivators or plows, and has for its object to simplify and improve the construction and produce an implement of this character wherein provision is made for adjusting the standards both laterally and vertically to adapt the implement to different-sized persons and also to adapt the implement to form furrows of different distances apart.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, porportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective view of the implement. Fig. 2 is a sectional side elevation. Fig. 3 represents a modified form of a hoe or moldboard detached.

The improved implement comprises a supporting-frame preferably of side members 10 11 diverging toward the rear and terminating at the rear ends in handles 12 13 and with a bearing-wheel 14 journaled between the forward ends. The side members 10 11 are connected near the rear ends by a "round" 15 and likewise connected near the forward ends by a rigid transverse member 16, the latter having a rearwardly-extending lug 17 provided with a transverse aperture.

Disposed between the side members 10 11 and also between the transverse members 15 16 are spaced members 18 19, having right-angled ends 20 21, pivoted, as at 22 23, respectively, to the side members to enable the members 18 19 to rotate freely between the side members. The members 18 19 are provided, respectively, with spaced perforations 24 25 to receive U-shaped clamping-clips 26, 27, 28, and 29, two clips to each member and each clip having one of its legs threaded and provided with a clamp-nut, as shown. Two of the hoe or moldboard standards 30 31 will be employed, one detachably coupled to the transverse member 18 by the clip 26 and the other similarly coupled to the transverse member 19 by the clip 28. The standards are provided, respectively, with rigidly-connected braces 32 33, coupled to the members 18 19 by the clips 27 29. By this simple means it is obvious the standards may be adjusted both vertically and laterally relative to the members 18 19 to cause the hoes or moldboards 41 42 to travel at any desired distance apart or any distance from the members 10 11 to not only regulate the relative height of the handles from the ground to adapt the implement to the size of the person using it, but also to regulate the lateral range of the implement. Thus the implement can be readily adapted to all the various conditions of the crops or the sizes of the plants or their distances apart and also to the size of the operator to render its operation convenient and less fatiguing.

Attached to standards 30 31 by flexible joints, such as staples 34 35, are stay-braces 36 37, having spaced transverse apertures 38 39 at their free ends, by which they may be adjustably clamped to the perforated stud 17, extending from the transverse member 16, as by a single bolt 40. By this means the standards 30 31, with their attached hoes, moldboards, or other similar cutting implements, may be adjusted at a greater or lesser inclination relative to the ground and supporting-frame, and when these adjustments are made it will be obvious that the members 18 19 will swing upon the centers 22 23, and thus obviate cramping the parts.

The hoes 41 42 are detachably connected to the standards, as by bolts, so that others of different form, as at 43, may be substituted therefor, thus adapting the implement for operation in different sizes and conditions of the plants.

By this means it will be noted that a simply-constructed efficient implement is produced which may be readily adjusted as required and which is strong and durable and can be manufactured at small expense and will be found very useful for gardeners and others requiring such a device.

If required, three or more of the standards, with their hoes or moldboards, may be employed by merely supplying additional transverse members 18 19 and their attachments.

Having thus fully described the invention, what is claimed is—

1. In a plow, a supporting-frame having spaced transverse members swinging by their ends between the frame members, standards disposed transversely of said transverse members and provided with rigid lateral braces likewise disposed transversely of said transverse members and spaced from said standards at their free ends, and means for adjustably connecting said standards and braces to said transverse members.

2. In a plow, a supporting-frame having spaced transverse members each provided with a plurality of spaced apertures, standards disposed transversely of said transverse members and provided with rigid lateral braces likewise disposed transversely of said transverse members and spaced from said standards at their free ends, U-shaped clips having one leg of each threaded and engaging said spaced apertures and embracing said standards and braces for detachably connecting same for lateral adjustment to said transverse members.

3. In a plow, a supporting-frame having spaced transverse members swinging by their ends between the frame members, standards disposed transversely of said transverse members and provided with rigid lateral braces likewise disposed transversely of said transverse members and spaced from said standards at their free ends, means for adjustably connecting said standards and braces to said transverse members and longitudinally-disposed braces each movably connected by one end respectively to said standard and free to move vertically and laterally relative thereto, and each brace connected by its free end adjustably to said frame in advance of said standards.

4. In a plow, a supporting-frame having a transverse member mounted to swing by its ends therein, a transverse member rigidly connected to said frame in advance of said swinging members and provided with a rearwardly-extending lug, a standard disposed transversely of said swinging members and connected adjustably thereto and provided with a rigidly-connected brace extending transversely of said swinging members and adjustably connected thereto, and longitudinally-disposed braces movably connected by one end respectively to said standards and adjustably connected by their other ends to said rearwardly-extending lug.

In testimony that I claim the foregoing as my own I have hereto affixed my signature in the presence of two witnesses.

THOMAS L. WILLCOX.

Witnesses:
I. E. NAGLE,
C. J. NAGLE.